(12) United States Patent
Zheng

(10) Patent No.: US 12,304,783 B2
(45) Date of Patent: May 20, 2025

(54) HIGH-SAFETY ELECTRIC CAPSTAN

(71) Applicant: NINGBO CHIMA WINCH CO., LTD., Zhejiang (CN)

(72) Inventor: Mingkui Zheng, Zhejiang (CN)

(73) Assignee: NINGBO CHIMA WINCH CO., LTD., Ningbo (CN)

( * ) Notice: Subject to any disclaimer, the term of this patent is extended or adjusted under 35 U.S.C. 154(b) by 366 days.

(21) Appl. No.: 18/076,470

(22) Filed: Dec. 7, 2022

(65) Prior Publication Data

US 2023/0174352 A1    Jun. 8, 2023

(30) Foreign Application Priority Data

Dec. 7, 2021 (CN) .......................... 202111487021.7
Feb. 16, 2022 (CN) .......................... 202210142243.3
Oct. 29, 2022 (CN) .......................... 202211339833.1

(51) Int. Cl.
*B66D 1/48*     (2006.01)
*B66D 1/12*     (2006.01)
*B66D 1/54*     (2006.01)
*H02H 7/08*     (2006.01)

(52) U.S. Cl.
CPC .............. *B66D 1/485* (2013.01); *B66D 1/12* (2013.01); *B66D 1/54* (2013.01); *H02H 7/0811* (2013.01); *H02H 7/0833* (2013.01); *B66D 2700/0141* (2013.01)

(58) Field of Classification Search
CPC ...... H02H 7/0833; H02H 7/0811; B66D 1/12; B66D 2700/0183; B66D 1/40; B66D 1/22; B66D 1/485; B66D 1/46; B66D 1/00; B66D 1/16; B66D 1/54; B66D 1/30; B66D 2700/0141; B66D 1/7447; B66D 1/505; B66D 1/7484; B66D 1/7463; H02P 6/26; H02P 7/295; H02P 23/07; H02P 25/03; H02P 25/062; H02P 25/064; H02P 25/18; H02P 29/02; H02P 2101/45; H02P 1/46; H02P 1/10; B66C 13/40; H02J 3/32
See application file for complete search history.

(56) References Cited

U.S. PATENT DOCUMENTS

2021/0139299 A1*    5/2021   Crain ....................... B66D 1/00

* cited by examiner

*Primary Examiner* — Antony M Paul

(57) ABSTRACT

The present disclosure provides a high-safety electric capstan including a hoisting mechanism, an electric motor configured to drive the hoisting mechanism to rotate, a user controller and an engagement assembly, and further including a control section electrically connected to a signal receiving actuator. The electric motor and the signal receiving actuator are electrically connected to the engagement assembly, respectively. The control section is configured for a user to send a trigger signal to the signal receiving actuator, the signal receiving actuator is configured to control an operation of the electric motor responsive to instructions from the user controller for a period of time when receiving the trigger signal, after the period of time, the signal receiving actuator is not responsive to instructions from the user controller. The solution of the present disclosure is advantageous for improving safety in use of an electric capstan.

6 Claims, 6 Drawing Sheets

HIGH-SAFETY ELECTRIC CAPSTAN

CROSS-REFERENCE TO RELATED APPLICATIONS

The present disclosure claims priority of Chinese patent Application No. 202111487021.7, filed on Dec. 7, 2021, Chinese patent Application No. 202210142243.3, filed on Feb. 16, 2022, Chinese patent Application No. 202211339833.1, filed on Oct. 29, 2022, the entire contents of which are hereby incorporated by reference.

TECHNICAL FIELD

The present disclosure relates to the technical field of capstans, in particular to a high-safety electric capstan.

DESCRIPTION OF THE PRIOR ART

Electric capstans as referred to herein mainly refer to on-board electric capstans. In order to achieve mobile use, the electric capstan relies primarily on a power supply from a vehicle's battery. Before the electric capstan is used, a positive pole and a negative pole of the electric capstan needs to be connected a positive pole and a negative pole of the battery via cables, so as to finish assembly and then is used within the vehicle. When the electric capstan is needed, a user operates a wire control or a remote control. Through operation of the wire control or the remote control, an engagement component, such as a relay, disposed on the electric capstan is connected to the battery (i.e., the power), such that the electric capstan rotates forward or backward.

The applicant previously proposed an electric capstan, its technical solution associates the power supply of the electric capstan with a starting switch of the vehicle. The electric capstan can only be powered when the starting switch is switched off, such that the electric capstan cannot be used when the vehicle is not started or when the vehicle is not powered, such a design has made a large safety improvement to the existing electric capstan. However, the applicant, through further investigation, proposes a high-safety electric capstan from another aspect.

SUMMARY OF THE DISCLOSURE

Embodiments of the present disclosure provide a high-safety electric capstan and the solution of the present disclosure is advantageous in improving safety in use of the electric capstan.

In order to achieve the above object, embodiments of the present disclosure employ the following technical solution.

A electric capstan includes a hoisting mechanism, an electric motor configured to drive the hoisting mechanism to rotate, a user controller and an engagement assembly, wherein the high-safety electric capstan further includes a control section electrically connected to a signal receiving actuator, the electric motor and the signal receiving actuator are electrically connected to the engagement assembly respectively, the control section is configured for a user to send a trigger signal to the signal receiving actuator, the signal receiving actuator is configured to control an operation of the electric motor responsive to instructions from the user controller for a period of time when receiving the trigger signal, otherwise the signal receiving actuator is not responsive to instructions from the controller.

In some embodiments, the signal receiving actuator includes a control chip, the control section includes a switch electrically connected to at least one pin of the control chip, the switch evokes the trigger signal and the trigger signal is input into the control chip through the pin.

In some embodiments, the signal receiving actuator is disposed in a control box and the switch is disposed on the control box.

In some embodiments, the signal receiving actuator is electrically connected to a circuit including a vehicle starting switch, the signal receiving actuator is powered when a vehicle is started or powered.

In some embodiments, the high-safety electric capstan further includes a control switch electrically connected to the circuit including a vehicle starting switch, the signal receiving actuator is powered, when a vehicle is started or powered as well as the control switch is switched off.

In some embodiments, the control switch is disposed on a center console within the vehicle.

In some embodiments, the high-safety electric capstan further includes a first pre-control assembly, the signal receiving actuator is electrically connected to the first pre-control assembly, the first pre-control assembly is connected in series to the electric motor and a conduction circuit of a vehicle battery, the signal receiving actuator is configured to control the first pre-control assembly to close/open the conduction circuit.

In some embodiments, the control section is disposed within a protective cover.

The present disclosure provides a high-safety electric capstan, in any case, the user sends a trigger signal to the signal receiving actuator only through the control section, the trigger signal causes the signal receiving actuator to control operation of the electric motor for a period of time responsive to instructions from the controller, otherwise, the signal receiving actuator is not responsive to instructions from the controller. Therefore, the dangerous situation of misoperation of the electric capstan will be better controlled, which reduce a risk of misoperation. Since the signal receiving actuator will not respond to the instructions of the controller beyond the period of time, there is no need for additional user operation, which reduces a user operational burden. And the accommodation of the user controller is also easier, the user may not be concerned about any misoperation of the user controller, as none of these misoperations will be performed at this time.

Figure 1:
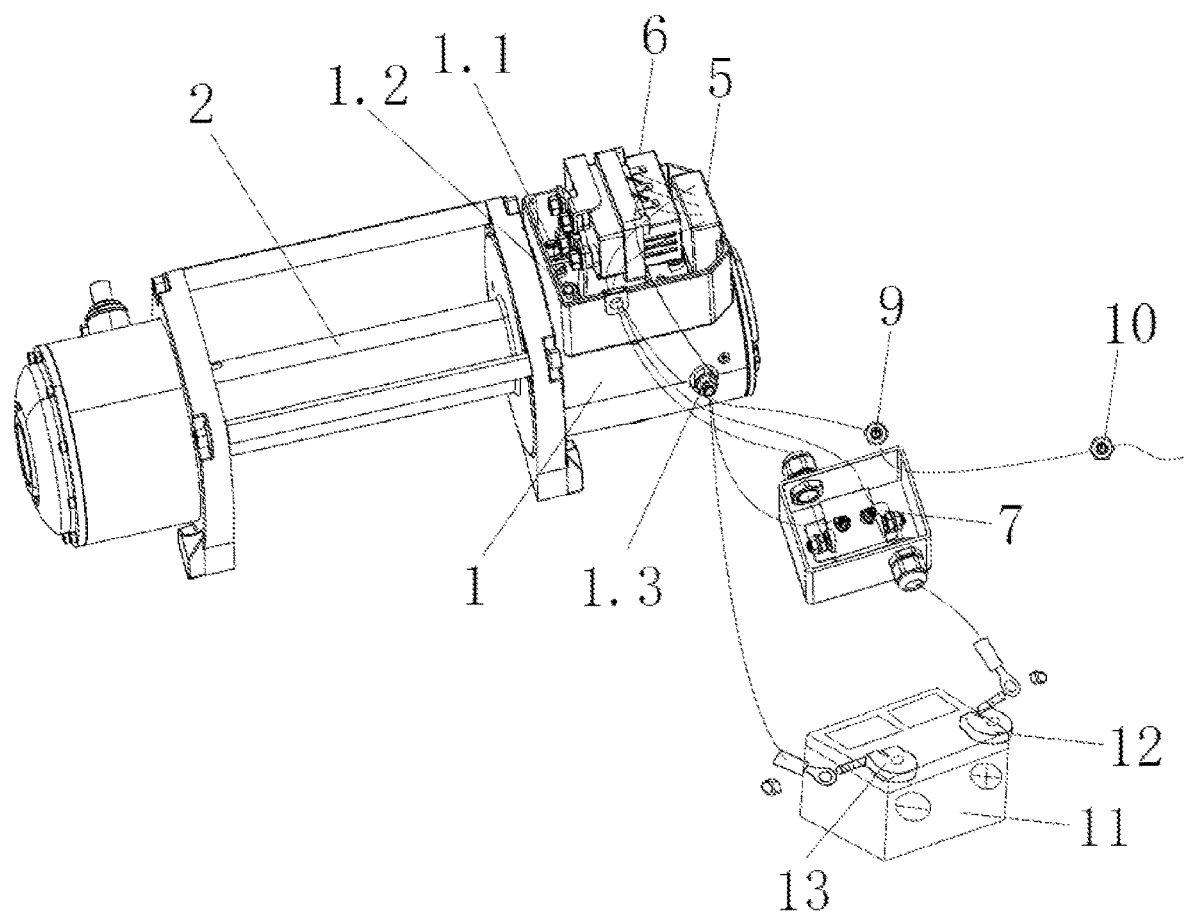
FIG. 1 is a schematic perspective view of a high-safety electric capstan connected to a battery and a starting switch.

Reference numerals: 1—electric motor, 1.1—first motor positive electrode, 1.2—second motor positive pole, 1.3—motor negative pole, 2—hoisting mechanism, 3—switch, 4—cable plug, 5—signal receiving actuator, 6—engagement assembly, 7—electromagnetic circuit breaker, 7.1—first terminal, 7.2—second terminal, 7.3—control terminal, 8—control chip, 9—control switch, 10—starting switch, 11—battery, 12—battery positive electrode, 13—battery negative electrode, 14—circuit including a vehicle starting switch, 15—center console, 16—conduction circuit, 17—user controller.

DESCRIPTION OF EMBODIMENTS

The following description is provided to disclose the present disclosure in order to enable those skilled in the art to practice the present disclosure. The embodiments in the following description are given as examples only and other obvious variations may occur to those skilled in the art. The underlying principles of the present disclosure defined in the following description may be applied to other embodiments, modifications, improvements, equivalents, and other technical solutions without departing from the spirit and scope of the present disclosure.

Those skilled in the art will appreciate that, in the disclosure of the present disclosure, the terms "longitudinal", "lateral", "upper", "lower", "front", "back", "left", "right", "vertical", "horizontal", "top", "bottom", "inner", "outer", etc. indicate an orientation or positional relationship based on that shown in the drawings. It is merely for the purpose of facilitating the description of the present disclosure and simplifying the description, and is not intended to indicate or imply that the devices or elements referred to must have a particular orientation, or be constructed and operate in a particular orientation, and thus the terms described above are not to be construed as limiting the present disclosure.

As shown in FIGS. 1 to 5, an embodiment of the present disclosure provides a high-safety electric capstan, including an electric motor 1, a hoisting mechanism 2, a user controller 17, a control section, a signal receiving actuator and an engagement assembly 6. Each of the electric motor 1 and the signal receiving actuator is electrically connected to the engagement assembly 6 respectively. The electric motor 1 is used to drives the hoisting mechanism 2 to rotate. The control section is electrically connected to the signal receiving actuator 5, the control section is configured for the user to send a trigger signal to the signal receiving actuator 5. The trigger signal causes the signal receiving actuator 5 to control an operation of the electric motor for a period of time in response to instructions from the user controller 17, otherwise the signal receiving actuator is not responsive to instructions from the user controller 17.

Figure 7:
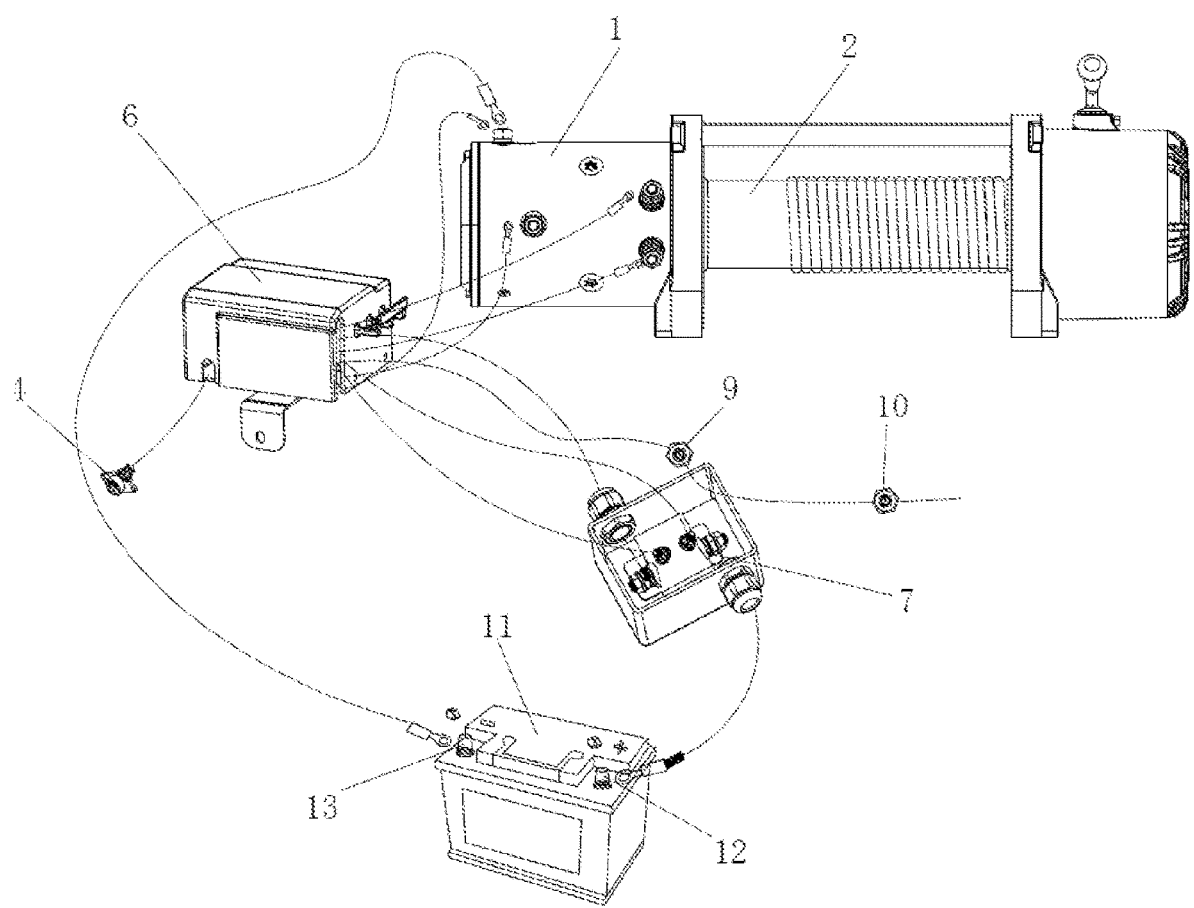
FIG. 7 is a schematic perspective view of an alternative high-safety electric capstan connected to a battery and a starting switch.

Since the vehicle is a more complex product, through the difference in the mounting position of the components, the present disclosure provides a certain installation flexibility. In the present disclosure, FIG. 1 and FIG. 7 exemplify two mounting solutions. FIG. 1 is an integrated or integrated mounting structure solution, in particular, FIG. 1 features that the engagement assembly 6 and the signal receiving actuator 5 are mounted as one component on the capstan, for example on the electric motor 1, while the electromagnetic circuit breaker 7 is mounted separately from the capstan. FIG. 7 shows the component as a separate structure mounted elsewhere than on the capstan, which can be seen as a separate mounting solution. In FIG. 7, this component and the electromagnetic circuit breaker 7 are installed separately from the capstan. In addition, a cable plug 4 is provided in FIG. 7, the cable plug 4 is connected to a cable member to perform wired control on the capstan.

Figure 4:
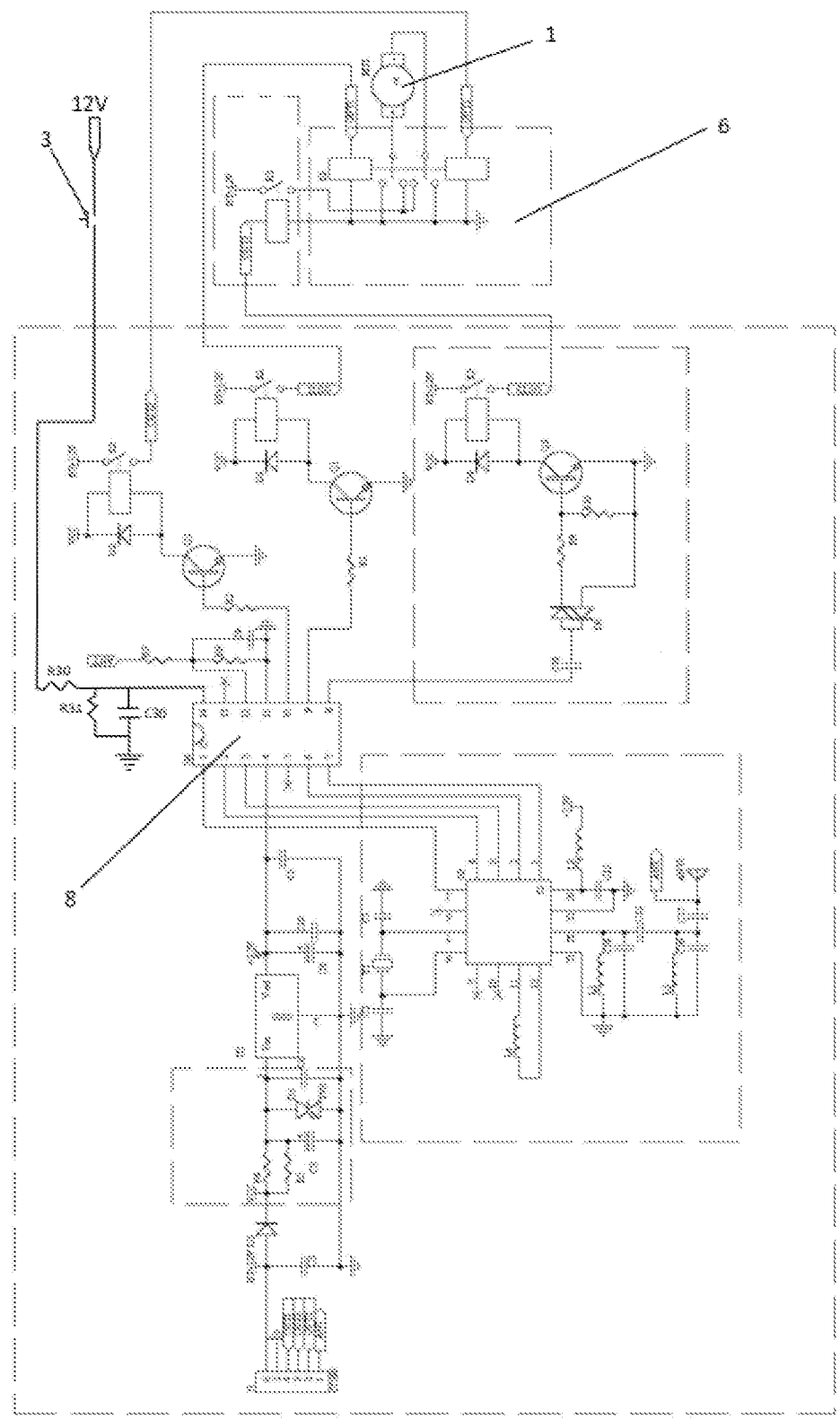
FIG. 4 is a schematic circuit diagram of a signal receiving actuator.
Figure 5:
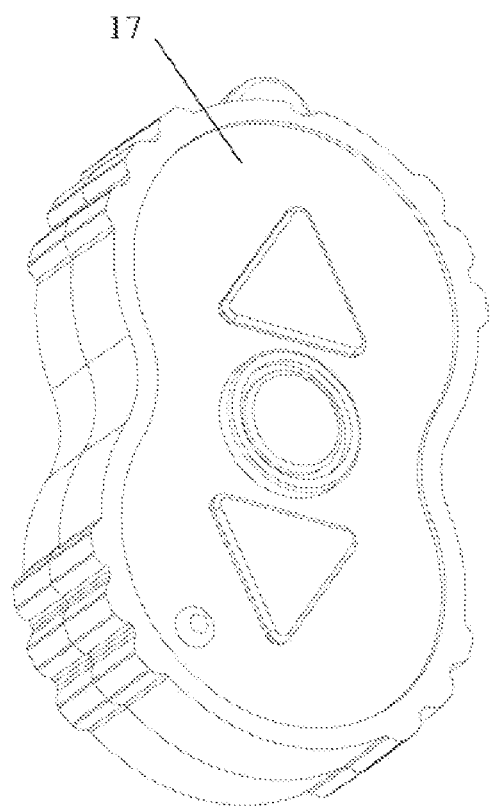
FIG. 5 is a schematic perspective view of a user controller of the high-safety electric capstan according to the present disclosure.

In some embodiments, as shown in FIG. 4, the signal receiving actuator 5 includes a control chip 8, the control chip 8 may employ a commercially available general purpose control chip, such as an 8-bit single chip with a model of EM78P153E, a microcontroller with a model of STM32F103R8T6, and the like. However, the particular chip employed is not the point of invention of the present disclosure, and all of the control chips 8 suitable for the present disclosure may be used in the present disclosure. The control section employs a switch 3 which is electrically connected to at least one pin of the control chip. The switch evokes a trigger signal which is input into the control chip through the pin. A switch 3, for example an inching switch, can spring up by itself after it is pressed and then released, such that the potential of the pin is changed. The control chip 8 is triggered due to the change of the potential, since the change of the potential of the pin is the basic principle of operation of the control chip 8. Therefore, with this principle, it is possible to trigger whether or not the control chip 8 enters a operating state, i.e., whether or not accept instructions of the user controller 17, by change in potential. Circuit portions such as the electric motor 1, the engagement assembly 6, and the like are drawn simultaneously in FIG. 4 for a more convenient understanding.

When the switch 3 is not pressed and then released, then the control chip 8 will not accept the instructions of the user controller 17 since the potential of the pin is unchanged. In order to keep the signal receiving actuator 5 working for a period of time, the signal receiving actuator 5 has a timing circuit. To simplify the structure, this timing circuit can be implemented with a timing function of the control chip 8. In this way, when there is a trigger, the timing function is used to count down. When the countdown is zero, the control chip 8 withdraws from the working status and will no longer accept the instructions of the user controller 17, unless it is triggered again. Such means of making the control chip 8 enter a certain working state through the trigger is conventional technology, there is no more discussion herein.

When there is a trigger, the signal receiving actuator 5 will accept the instructions of the user controller 17 for a period of time, over the period of time, for example an hour, the signal receiving actuator 5 may control whether the engagement component 6 is engaged in response to instructions from the user controller 17. If the engagement assembly 6 is engaged, the engagement assembly 6 conducts the battery 11 to the electric motor 1, and if the engagement assembly 6 is not engaged, the engagement assembly 6 disconnects the battery 11 from the electric motor 1. In addition, the electric motor 1 can be controlled to turn around by using the engagement assembly 6.

In some embodiments, as shown in FIG. 1, the signal receiving actuator 5 is disposed within a control box and the switch 3 is disposed on a box cover of the control box, thereby facilitating user's handling.

In some embodiments, as shown in FIG. 1, the signal receiving actuator 5 is electrically connected to a circuit 14 including a vehicle starting switch 10. When a vehicle is started or powered, i.e., the starting switch 10 activates the circuit, the signal receiving actuator 5 is powered. The starting switch 10 is an electrical door of the vehicle. Such design further improves a safety, in particular electric capstan is used in a vehicle starting state, there is a higher safety. Such safety improvement means that, on one hand, the signal receiving actuator 5 is active only in a vehicle starting state, the battery (vehicle electric bottle) will not lose electricity, so it is beneficial to ensure the safety of vehicle in use, on the other hand, in the vehicle starting state, it is beneficial to provide sufficient power supply for the electric capstan, thus facilitating the operation of the electric capstan.

Furthermore, the high-safety electric capstan further comprises a control switch 9 electrically connected to the circuit 14 including a vehicle starting switch 10. When the vehicle is started or powered on, and the control switch 9 is switched off, the signal receiving actuator 5 is powered. With this design, the signal receiving actuator 5 can be powered only when the control switch 9 is switched off, which avoids that the signal receiving actuator 5 is powered when the vehicle is traveling normally, and thus the safety is higher. Therefore, when the electric capstan needs to be manipulated, in addition to starting the vehicle, it is also necessary to operate the control switch 9. For situations when the vehicle is turned on, but the electric capstan is not needed, misoperation of the electric capstan can thereby be effectively avoided. For example, the electric capstan cannot be operated during vehicle travel if the control switch 9 is not turned on, which brings great benefits by making very simple improvement to a structure.

In some embodiments, the control switch 9 is provided on a center console 15 within the vehicle, thereby facilitating user's operation.

In some embodiments, as shown in FIGS. 1 and 4, the high-safety electric capstan includes a first pre-control assembly, the signal receiving actuator 5 is electrically connected to the first pre-control assembly, the first pre-control assembly is connected in series to the electric motor 1 and a conduction circuit 16 of a vehicle battery, the signal receiving actuator 5 is configured to control the first pre-control assembly to close/open the conduction circuit 16. With such a design, when the electric capstan doesn't operate, the electric capstan is in a power-off state, which does not result in a battery deficit. Only when the signal receiving actuator 5 accepts the instructions of the user controller 17, the electric capstan is conductive. The signal receiving actuator 5 may control the first pre-control assembly and the engagement assembly 6 to close/open simultaneously. And it is also possible to pre-close the first pre-control assembly during the period of time when the signal receiving actuator 5 accepts instructions of the user controller 17. When the user controller 17 issues a forward turn instruction or a reversal turn instruction, then the signal receiving actuator 5 controls the engagement assembly 6. Under this situation, the first pre-control assembly is always closed, and when the signal receiving actuator 5 is not in the period accepting instructions of the user controller 17, then the first pre-control assembly is disconnected.

In the related art, the electric motor 1 includes a first motor positive pole 1.1, a second motor positive pole 1.2 and a motor negative pole 1.3, and the engagement assembly 6 employs a relay. The relay is disposed on the conduction circuit 16, by means of this relay, a battery positive electrode 12 may be selectively connected to the first motor positive electrode 1.1 or to the second motor positive electrode 1.2. Since the motor negative electrode 1.3 has been electrically connected to a battery negative electrode 13, the electric motor 1 turns forward when the battery positive electrode 12 is connected to the first motor positive electrode 1.1 and reverses when the battery positive electrode 12 is connected to the second motor positive electrode 1.2.

Figure 6:
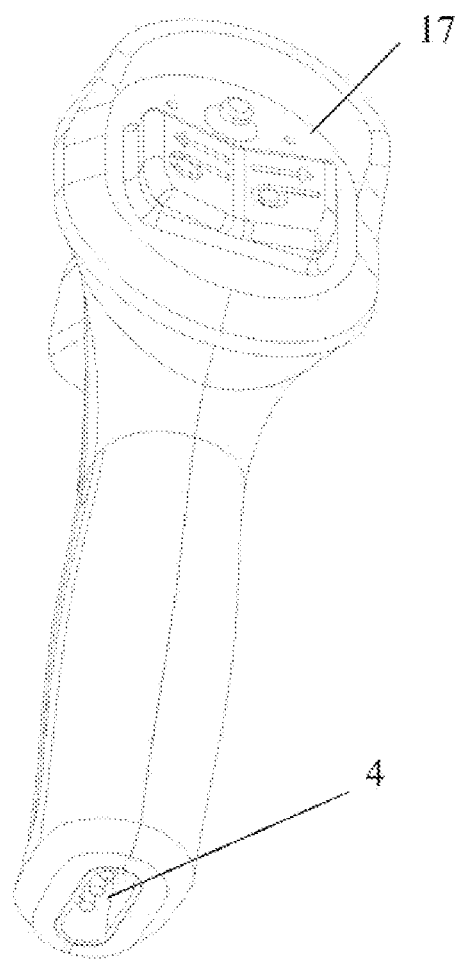
FIG. 6 is a schematic perspective view of an alternative user controller of the high-safety electric capstan according to the present disclosure.

In the related art, the user controller 17 includes a wire controller and/or a remote controller. The wire controller is detachably and electrically connected to the signal receiving actuator 5 via the cable plug 4 to transfer signals in a wired form. The remote controller is wirelessly connected to the signal receiving actuator 5, and the signal receiving actuator 5 is configured to receive a wireless signal from the remote controller and operates in accordance with the wireless signal. The electric capstan may comprise both of the wire controller and the remote controller. FIG. 6 shows an alternative user controller 17.

Figure 2:
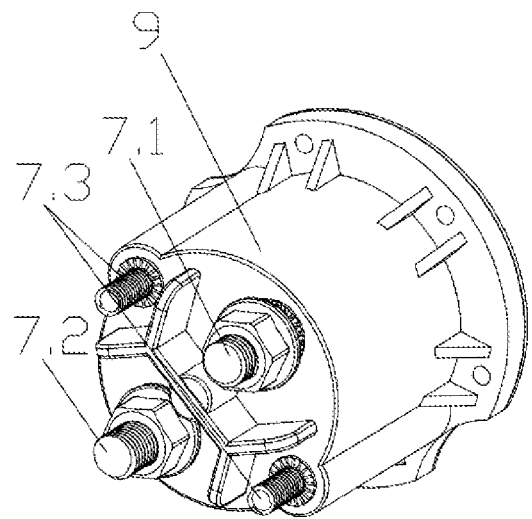
FIG. 2 is a schematic perspective view of an electromagnetic circuit breaker.
Figure 3:
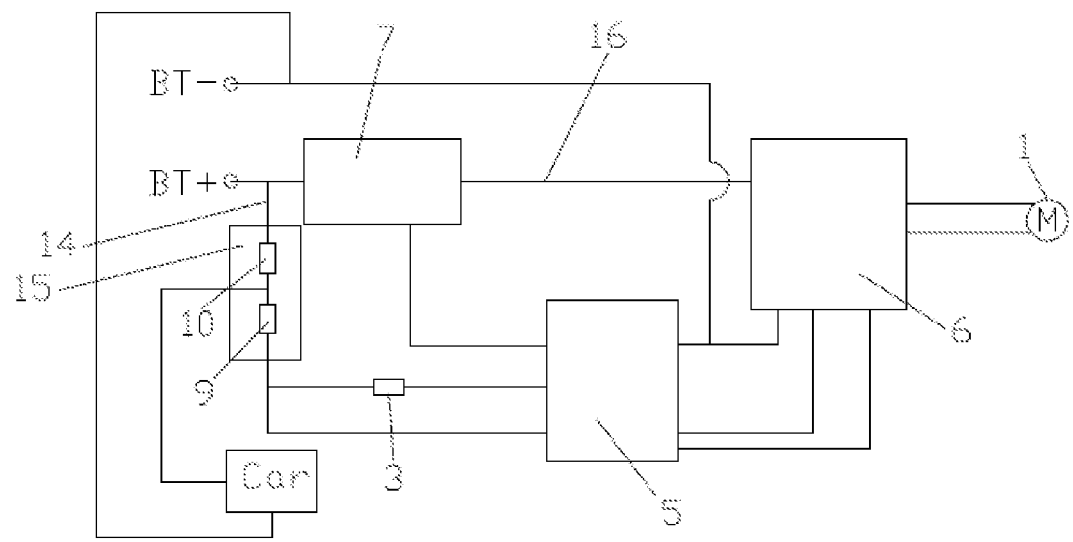
FIG. 3 is a schematic circuit diagram of a high-safety electric capstan.

In some embodiments, as shown in FIGS. 2 and 3, the first pre-control assembly includes an electromagnetic circuit breaker 7, a first terminal 7.1 and a second terminal 7.2 of the electromagnetic circuit breaker 7 are electrically connected to the conduction circuit 16, respectively, and a control terminal 7.3 of the electromagnetic circuit breaker 7 comprises a positive end and a negative end, the positive end and the negative end are electrically connected to the signal receiving actuator 5. The signal receiving actuator 5 controls the electromagnetic circuit breaker 7 to perform an electromagnetic attraction action and thereby turning on/off the first terminal 7.1 and the second terminal 7.2.

In some embodiments, the electromagnetic circuit breaker 7 employs the electromagnetic circuit breaker 7 that performs disconnection when the power is cut off. With this design, it is possible to guarantee an open state of the conduction circuit 16 without a power supply. Therefore, on one hand, it is beneficial to improve satisfy, on the other hand, it is beneficial to simplify the configuration of the structure. In other words, there is no need to set up more structures to consider the open state.

In some embodiments, the control section is disposed within a protective cover, for example, the switch 3 is disposed in a hood of a vehicle, the hood of the vehicle may correspond to the protective cover. In another example, the protective cover may be a separate waterproof protective cover or the like.

In understanding the present disclosure, the above structures can be understood by reference to other embodiments/drawings, if necessary, which will not be repeated here.

The above description is only specific embodiments of the present disclosure, the scope of the present disclosure is not limited thereto. Any changes or substitutions made by any person skilled in the art within the technology scope disclosed in this disclosure shall be covered by the protection scope of this disclosure. Therefore, the protection scope of the present disclosure should be subject to the protection scope of the following claims.

The invention claimed is:

1. A high-safety electric capstan comprising a hoisting mechanism, an electric motor configured to drive the hoisting mechanism to rotate, a user controller and an engagement assembly, wherein the high-safety electric capstan further comprises a control section electrically connected to a signal receiving actuator, the electric motor and the signal receiving actuator are electrically connected to the engagement assembly respectively, the control section is configured for a user to send a trigger signal to the signal receiving actuator, the signal receiving actuator is configured to control an operation of the electric motor responsive to instructions from the user controller for a period of time when receiving the trigger signal, after the period of time, the signal receiving actuator is not responsive to instructions from the user controller.

2. The high-safety electric capstan according to claim 1, wherein the signal receiving actuator comprises a control chip, the control section comprises a switch electrically connected to at least one pin of the control chip, the switch evokes the trigger signal and the trigger signal is input into the control chip through the pin.

3. The high-safety electric capstan according to claim 1, wherein the signal receiving actuator is electrically connected to a circuit including a vehicle starting switch, the signal receiving actuator is powered when a vehicle is started or powered.

4. The high-safety electric capstan according to claim 3, wherein the high-safety electric capstan further comprises a control switch electrically connected to the circuit including a vehicle starting switch, the signal receiving actuator is powered when a vehicle is started or powered as well as the control switch is switched off.

5. The high-safety electric capstan according to claim 4, wherein the control switch is disposed on a center console within the vehicle.

6. The high-safety electric capstan according to claim 1, the high-safety electric capstan further comprises a first pre-control assembly, the signal receiving actuator is electrically connected to the first pre-control assembly, the first pre-control assembly is connected in series to the electric motor and a conduction circuit of a vehicle battery, the signal receiving actuator is configured to control the first pre-control assembly to close or open the conduction circuit.

\* \* \* \* \*